United States Patent [19]

Tokumaru

[11] Patent Number: 4,962,511
[45] Date of Patent: Oct. 9, 1990

[54] BARREL SHIFTER

[75] Inventor: Takeji Tokumaru, Yokohama, Japan

[73] Assignee: Kabushiki Kaisha Toshiba, Kawasaki, Japan

[21] Appl. No.: 380,439

[22] Filed: Jul. 17, 1989

[30] Foreign Application Priority Data

Jul. 15, 1988 [JP] Japan .................. 63-175222

[51] Int. Cl.⁵ .................. G06F 7/00; H03K 17/00
[52] U.S. Cl. .................. 377/69; 377/70; 364/715.08
[58] Field of Search .................. 377/69, 70, 77; 364/715.08

[56] References Cited

U.S. PATENT DOCUMENTS

| | | | |
|---|---|---|---|
| 4,181,976 | 1/1980 | Collins et al. | 377/69 |
| 4,665,538 | 5/1987 | Machida | 377/69 |
| 4,811,369 | 3/1989 | Barnard et al. | 377/69 |
| 4,821,299 | 4/1989 | Kawai et al. | 377/77 |

Primary Examiner—John S. Heyman
Attorney, Agent, or Firm—Foley & Lardner, Schwartz, Jeffery, Schwaab, Mack, Blumenthal & Evans

[57] ABSTRACT

There is disclosed a barrel shifter for providing efficient wiring therein and a compact composition as compared with conventional ones, in which a low-level-input resistor and a high-level-input resistor are arranged in parallel to each other, and low-level-input-bit lines and high-level-input-bit lines are alternately arranged corresponding to both resistors respectively, the width of both the input and output sides of a barrel-shifter main unit are so arranged as to be substantially the same as the width of the respective resistors substantially defined by wiring width of the respective input-bit lines, and a wiring area from the high-level-input resistor is incorporated in the barrel-shifter main unit as well as a wiring area from the low-level-input resistor.

6 Claims, 6 Drawing Sheets

AN EMBODIMENT ACCORDING
TO THE PRESENT INVENTION

AN EMBODIMENT ACCORDING
TO THE PRESENT INVENTION

BARREL SHIFTER

BACKGROUND OF THE INVENTION

1. Field of the Invention

The present invention relates to a barrel shifter, and particularly to a barrel shifter to be mounted on a LSI for a microprocessor for producing efficient wiring and having a compact composition as compared with conventional ones.

2. Description of the Prior Art

Generally, any of customary barrel shifters has a low-level-input resistor, a high level-input resistor, a barrel-shifter main unit, and a bus driver. The low-level-input resistor has a predetermined number of low-level-input-bit lines and width substantially defined by wiring width of the lines, and the high-level-input resistor has high level-input-bit lines of the same number as the low-level-input-bit lines and width substantially the same as the low-level-input resistor. Both the input resistors are arranged by the input side of the main unit, and the bus driver is arranged by the output side thereof.

Conventionally, the circuit width of the input side of the main unit for wiring from both the input resistors is wider than the circuit width of the output side thereof for wiring to the bus driver, so that the main unit and the other compositional elements arranged at either side of the main unit are disorder in the respective circuit width for wiring, and hence wiring for the entire circuit of a barrel sifter becomes complicated and a dead space is caused.

In order to clarify the defects of conventional barrel shifters, the operational principle is now described.

FIG. 1 is a schematic view for explaining operation of a barrel shifter.

In the left-shift operative mode, data to be shifted are set in a low-level-input resistor 1, and all zeros are set as shift-in data in a high-level-input resistor. By such selling, for example, a resultant output shifted by 2 bits in the left direction can be obtained at a main unit 3.

Similarly, the right-shift operation of the barrel shifter is shown in FIG. 2. In the right-shift operative mode, all zeros or coded numbers of MSB(the highest bit) are set as shift-in data in the low-level-input resistor 1, and data to be shifted are set in the high-level-input resistor 2. By such setting, for example, a resultant output shifted by 2 bits in the right direction can be obtained at the main unit bits in the right direction can be obtained at the main unit 3.

One of a conventional barrel shifter for effecting such shift operation is shown in FIG. 3. In the drawing, there are shown a low-level-input resistor 1, a high-level-input resistor 2 and a barrel-shifter main unit 3, and reference numeral 4 designates a bus driver.

The low-level-input resistor 1 and the high-level-input resistor 2 are respectively provided with low-level-input-bit lines $LB_0$–$LB_{31}$, connected to a low-level bus and high-level-input-bit lines $HB_0$–$HB_{31}$, connected to a high-level bus, and their circuit width are respectively and substantially defined by wiring width of the respective input-bit lines.

In this case, the circuit width of the input side of the main unit 3 is corresponding to output from a total of 62 bits of both the low-level-input resistor 1 and the high-level-input resistor 2. On the other hand, the width of the output side of the main unit 3 is only corresponding to output of 32 bits having been shifted by a predetermined bit number.

Accordingly, in the entire compositioon of the conventional barrel shifter, as shown in FIG. 3, the input side of the main unit 3 is wider than the output side thereof, and hence a specific portion of the main unit 3, i.e., an area designated by oblique lines becomes a dead space.

Moreover, when the shifted output from the main unit 3 is outputted into low-level-output lines LB' or high-level-output lines HB' through the bus driver 4, a wiring area designated by reference character "A" in the drawing where wires to be wired in the circuit must be bent is inevitably required in the input side of the bus driver 4.

While, as shown in FIG. 4, when the barrel shifter is so composed that the low-level-input-bit lines $LB_0$–$LB_{31}$ and the high-level-input-bit lines $HB_0$–$HB_{31}$ are alternately arranged at the low-level-input resistor 1 and the high-level-input resistor 2 respectively, the width of the bus driver 4 can be reduced and the area where the wires must be bent can be avoided. However, in this case, as shown in FIG. 4, another area designated by reference character "A" in which wires to be wired must be similarly bent to the area λ shown in FIG. 3 is inevitably required at the output side of the high-level-input resistor 2, thus efficient circuit wiring can not be performed even by the composition. Moreover, there also remains a dead space designated by oblique lines substantially similar to the one shown in FIG. 3.

As stated above, in the conventional barrel shifter, since the width of the input side of the main unit is wider than that of the output side of thereof, the area where the wires to be wired must be bent is inevitably required.

SUMMARY OF THE INVENTION

It is therefore an object of the present invention to utilize the circuit area of a barrel shifter more effectively by improving the composition of the barrel shifter and alternately arranging the low-level-input-bit lines and the high-level-input lines at the respective input resistors.

In order to achieve the object, a barrel shifter according to the present invention has a low-level-input resistor with low-level-input-bit lines, a high-level-input resistor with high-level-input-bit lines, a barrel-shifter main unit having a shift control input lines, and a bus driver. The low-level-input resistor and the high-level-input resistor are arranged in parallel to each other, and the low-level-input-bit lines and the high-level-input-bit lines are arranged alterntely at predetermined intervals corresponding to the low-level-input resistor and the high-level-input resistor respectively. The width of both the input and output sides of the main unit are so arranged as to be substantially the same as that of one of the low-level-input resistor and the high-level-input resistor. A wiring area in which wires are provided from the high-level-input resistor is incorporated in the main unit as well as a wiring area from the low-level-input resistor.

By such compostion, efficient circuit wiring in a barrel shifter can be achieved.

These and other objects, features and advantages of the present invention will be more apparent from the following description of a preferred embodiment, taken in conjuction with the accompanying drawings.

DETAILED DESCRIPTION OF THE EMBODIMENT

Figure 1:
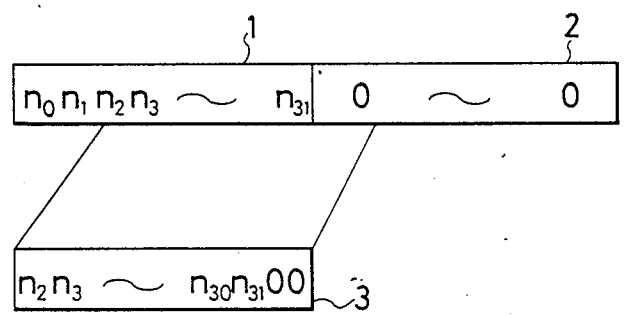
FIG. 1 is a schematic view for explaining a general left-shift operation of a barrel shifter.
Figure 2:
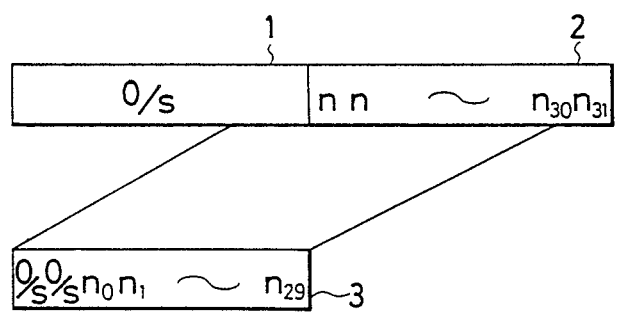
FIG. 2 is a shematic view for explaining a general right-shift operation of a barrel shifter.
Figure 3:
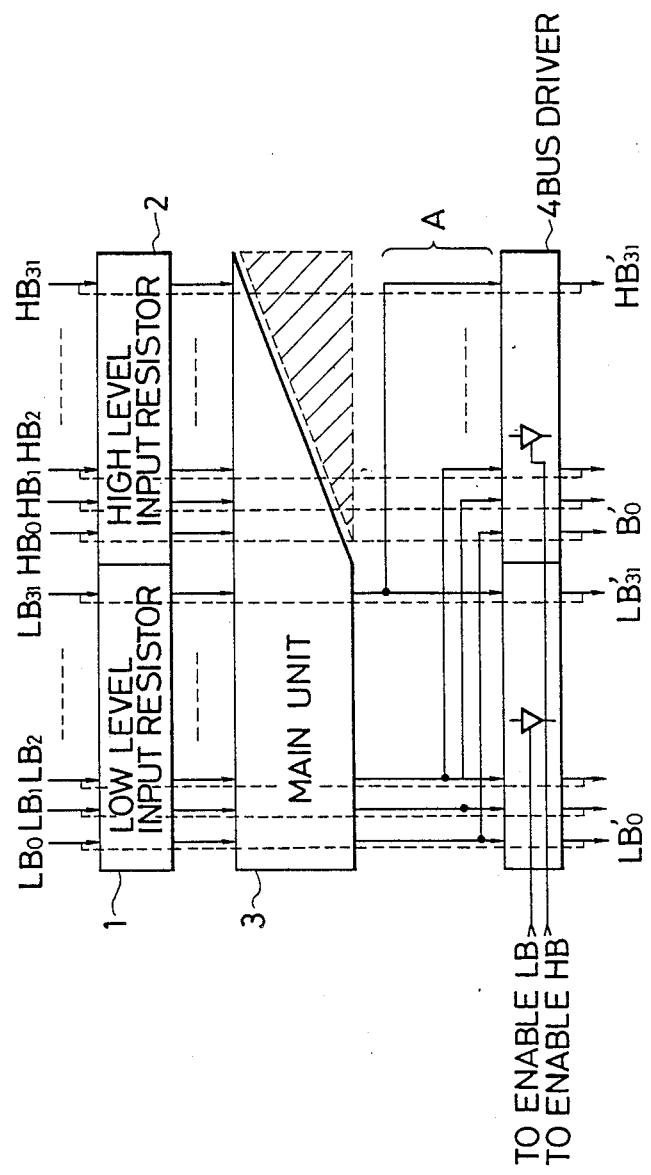
FIG. 3 is a compositional view of a conventional barrel shifter.
Figure 4:
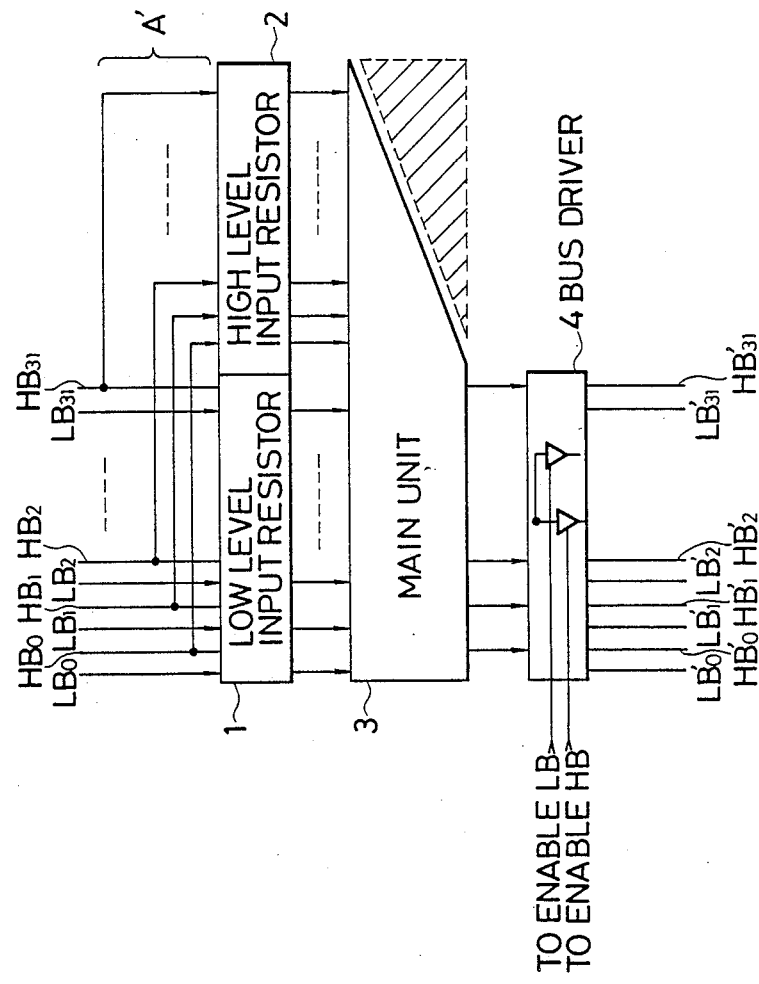
FIG. 4 is a compositional view of another conventional barrel shifter.
Figure 5:
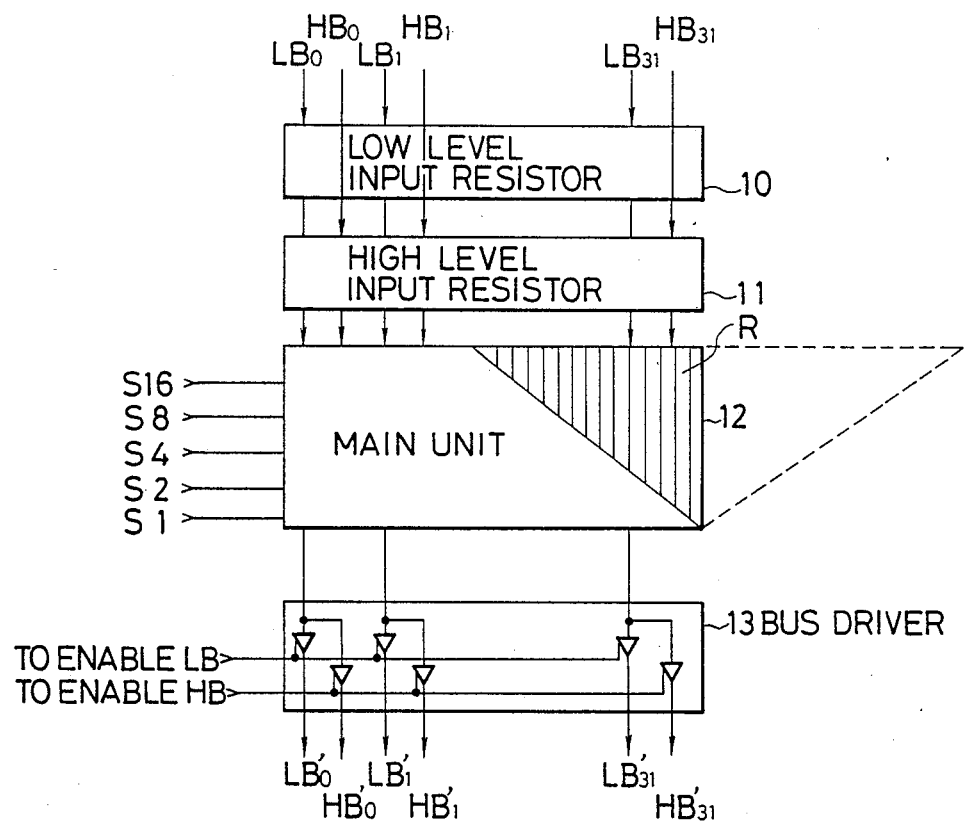
FIG. 5 is a fundamental compositional view of a barrel shifter according to the present invention, FIG. 6 (a-b) is a compositional view of an embodiment of a barrel shifter according to the present invention.

FIG. 5 shows a fundatmental compositional view of a barrel shifter according to the present invention. In the drawing, there are shown a low-level-input resistor 10, a high-level-input resistor 11, a barrel-shifter main unit 12 having a shift control input lines, and a bus driver 13.

In the barrel shifter according to the present invention, the low-level-input resistor 10 and the high-level-input resistor 11 are arranged in parallel to each other as shown in the drawing, and low-level-input-bit lines $LB_0$–$LB_{31}$ and high-level-input-bit lines $HB_0$–$HB_{31}$ are alternately connected to the input resistors 10, 11 respectively. With respect to the barrel-shifter main unit 12, there is incorporated in an area designated by oblique lines R in the main unit 12 the wiring area designated by broken lines where wiring corresponding to the bit number of the high-level-input resistor 11 was conventionally provided.

Figure 6A:
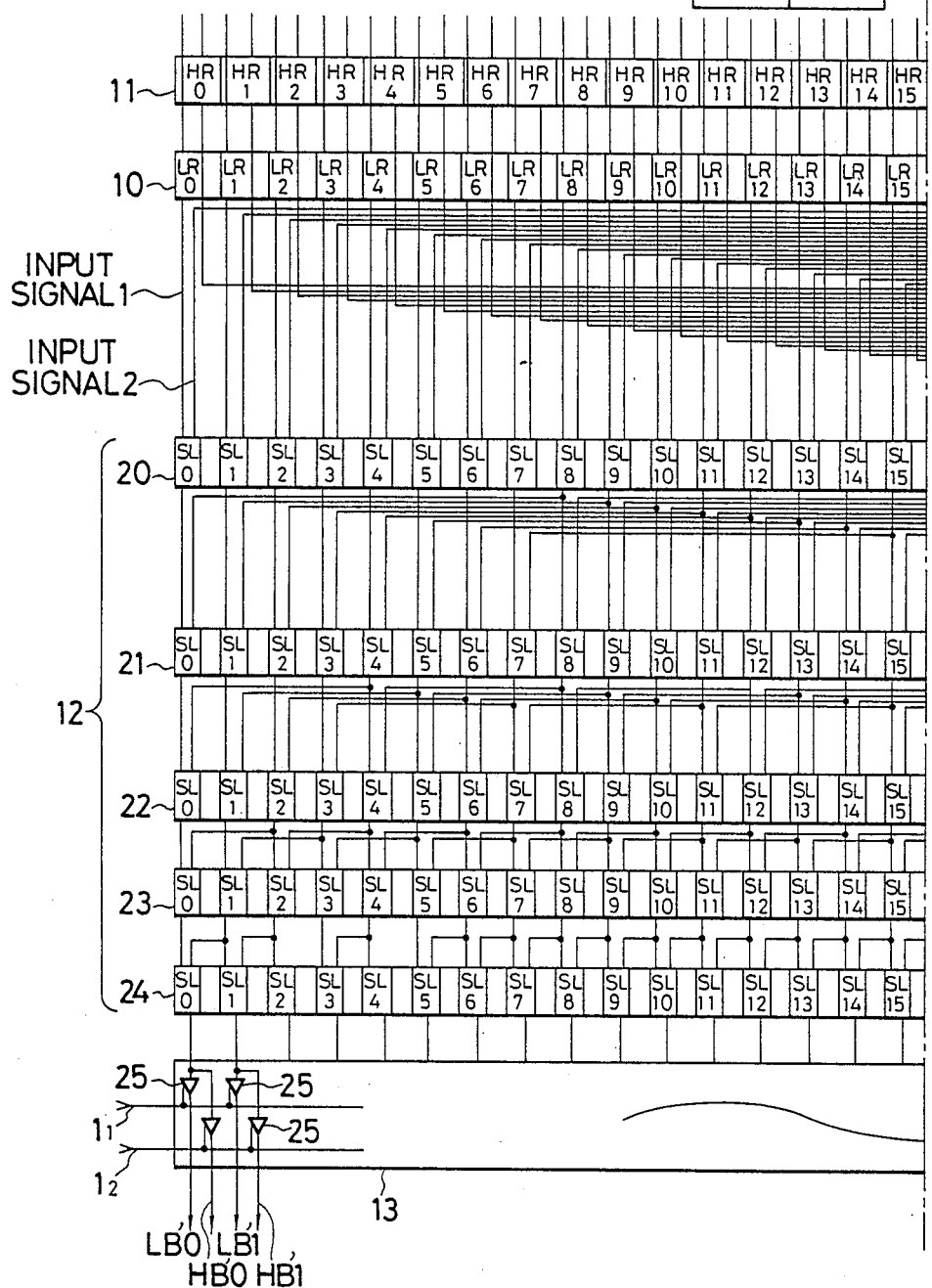
Figure 6B:
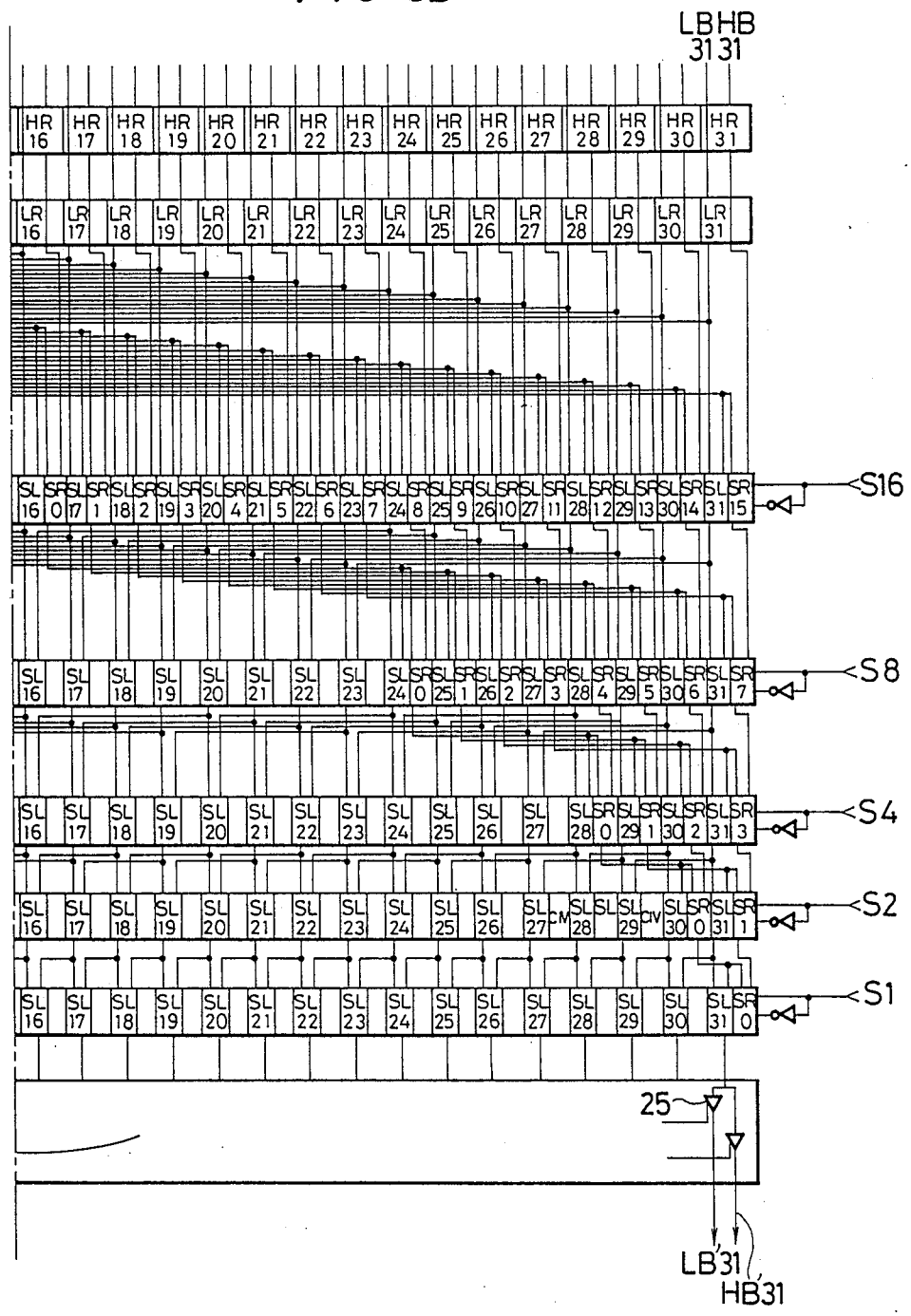

FIG. 6 shows a composition of an embodiment of a barrel shifter according to the present invention.

In the drawing, there are shown a low-level-input resistor 10 of 32 bits from $LR_0$ to $LB_{31}$, a high-level-input resistor 11 of 32 bits from $HR_0$ to $HR_{31}$, and a barrel-shifter main unit 12 is composed with a selector 20 for effecting 16-bit shift and connecting to an input line S16, a selector 21 for effecting 8-bit shift and connecting to an input line S8, a selecting 22 for effecting 4-bit shift and connecting to an input line S4, a selector 23 for effecting 2-bit shift and connecting to an input line S2, and a selector 24 for effecting 1-bit shift and connecting to an input line S1.

A bus driver 13 has 3-state bus drivers 25, and selects output from the selector 24 of the final step at any of the 3-state bus drivers, and outputs to the low-level-output-bit lines $LB'_0$–$LB'_{31}$ or the high-level-input-bit lines $HB'_0$–$HB'_{31}$ or the high-level-input-bit lines $HB'_0$–$HB'_{31}$.

In FIG. 6, the wires to be wired in the area designated by oblique lines R shown in FIG. 5 are connected to shift-left input (designated by SL) and shift-right input (designated by SR) of respective selectors.

Hereinafter, operation of the above-mentioned embodiment of a barrel shifter according to the present invention will be described.

In the left-shift operative mode, data to be shifted are inputted in the low-level-input resistor 10, while all zeros are inputted as shift-in data in the high-level-input resistor 11. When is desired output to be shifted by 16 bits, an input signal is given to the input line S16 of the selector 20, so that the resultant data shifted by 16 bits through the selector 20 is outputted to the input side of the bus driver 25. Thereafter, when a selective line 1, of the bus driver 25 is set in a high level mode, output of the main unit 12 is outputted into the low-level-output-bit lines $LB'_0$–$LB'_{31}$, while when a selective line $1_2$ is set in a high level mode, the output of the main unit 12 is outputted into the high-level-output-bit lines $HB'_0$–$HB'_{31}$. On the other hand, in the right-shift operative mode, all zeros are inputted as shift-in data in the low level-input resistor 10, while data to be shifted are inputted in the high-level-input resistor 11. Then, when any of the shift control input lines S1–S16 corresponding to the bit number to be shifted is energized, desired right-shift can be effected. In this case, the operational principle of the shift is the same as that of the above-mentioned well-known barrel shifters.

Figure 7:
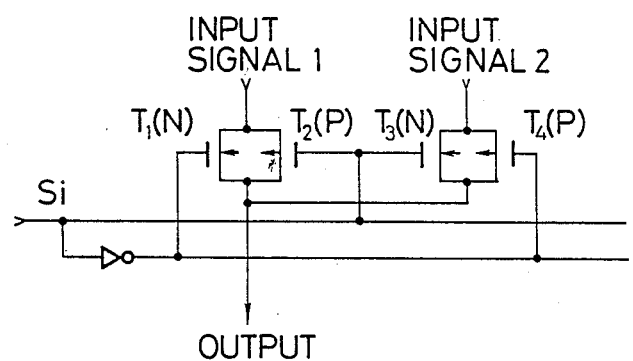
FIG. 7 is a compositional view of a circuit per bit in each selector for composing a main unit of a barrel shifter.

FIG. 7 shows a circuit composition per bit included in each the selector 20, 21, 22, 23 or 24 respectively composing the main unit 12 shown in FIG. 6.

The circuit is composed by two pairs of N-channel transistors and P-channel transistors, i.e., $T_1$, $T_2$ and $T_3$, $T_4$ as shown in the drawing. When a shift control lines $S_1$ is given "1", an input signal 2 is selected, while given "2", an input signal "1" is selected.

In summary, in the barrel shifter according to the present invention, the low-level-input resistor and the high-level-input resistor are arranged in parallel to each other, and the low-level-input-bit lines and high-level-input bit lines are arranged alternately corresponding to the respective input resistors, and the width if both the input and output sides if the barrel-shifter main unit are so arranged as to be substantially the same as that of one of the low-level and high-level input resistors, and further the wiring area corresponding to the bit number of the high-level-input resistor is incorporated in the barrel-shifter main unit.

Accordingly, there can be eliminated the wiring area which is inevitably required in conventional barrel shifters and in which wires to be wired must be bent for input from the input resistors to the main unit or output from the main unit to the bus driver, so that wiring area for the barrel shifter can be reduced. Moreover, the width of both the input and output sides of the main unit is so arranged as to be substantially the same as the low-level-input resisitor and the high-level-input resistor, and further is incorporated in the main unit the wiring area which was inevitably and additionally provided at the main unit in conventional barrel shifters and caused the width of the input side of the main unit to be wider than the width of the output side thereof, so that there can be provided a barrel shifter with a compact composition.

Moreover, in the barrel shifter according to the present invention, the wiring area which was inevitably and additionally provided at the main unit in conventional barrel shifters may be incorporated in the main unit in a wedge form.

Additionally, in the barrel shifter according to the high-level-input resistor may be piled in parallel each other.

Various modifications will become possible for those skilled in the art after receiving the teachings of the present disclosure without departing from the scope thereof.

What is claimed is:

1. A barrel shifter, comprising:

(a) a low-level-input resistor having a predetermined number of low-level-input-bit lines for setting data to be shifted;
(b) a high-level-input resistor having a predetermined number of high-level-input-bit lines for setting data to be shifted,
(c) the low-level-input resistor and the high-level-input resistor being arranged in parallel to each other such that the low-level-input-bit lines and high-level-input-bit lines are alternately arranged at predetermined intervals corresponding to the low-level-input resistor and the high level-input resistor respectively; and
(d) a barrel-shifter main unit for obtaining a shifted resultant,
(e) a wiring area in which wires from the high-level-input resistor are wired being incorporated in the barrel-shifter main unit as well as a wiring area from the low-level-input resistor such that the width of the input side of the barrel-shifter main unit are arranged to be substantially the same as the width of one of the low-level-input resistor and the high-level-input resistor.

2. The barrel shifter according to claim 1, wherein the wiring area in which wires from the high-level-input resistor are wired is in a form of wedge.

3. The barrel shifter according to claim 1, wherein the low-level-input resistor and the high-level-resistor are piled on each other in parallel.

4. A barrel shifter, comprising:
(a) a low-level-input resistor of n bits;
(b) a high-level-input resistor of n bits;
(c) a barrel-shifter main unit for obtaining a shifted resultant;
(d) a bus driver for supplying the shifted resultant from the barrel-shifter main unit to a bus,
(e) the low level-input resistor and the high-level-input resistor being arranged in parallel to each other so as to alternately supply high level-input bit signals and low-level-input bit signals to the low-level-input resistor and high-level-input resistor.
(f) a wiring area corresponding to the n bits of the high-level-input resistor being incorporated in the barrel-shifter main unit.

5. The barrel shifter according to claim 4, wherein the wiring area in which wires from the high-level-input resistor are wired is in a form of wedge.

6. The barrel shifter according to claim 4, wherein the low-level-input resistor and the high-level-resistor are piled on each other in parallel.

* * * * *